United States Patent [19]

Ratchford et al.

[11] Patent Number: 4,633,473
[45] Date of Patent: Dec. 30, 1986

[54] FAULT TOLERANT COMMUNICATIONS INTERFACE

[75] Inventors: Michael Ratchford, East Granby; Richard L. Bue, West Hartford; Alexander Charov, Moodus, all of Conn.

[73] Assignee: United Technologies Corporation, Hartford, Conn.

[21] Appl. No.: 637,187

[22] Filed: Aug. 2, 1984

[51] Int. Cl.[4] ............................................. G06F 11/00
[52] U.S. Cl. ...................................... 371/68; 371/70; 371/8
[58] Field of Search ................... 371/8, 66, 67, 68, 62, 371/70

[56] References Cited

U.S. PATENT DOCUMENTS 3,920,975 11/1975 Bass .......................................... 371/8
4,365,248 12/1982 Bargeton ................................. 371/8
4,442,521 4/1984 Inaba ....................................... 371/68

Primary Examiner—Michael R. Fleming
Attorney, Agent, or Firm—Dominic J. Chiantera

[57] ABSTRACT

A communications interface exchanges serial bit signals between sources differentially, over redundant, two conductor, primary and secondary channels. The primary channel provides the communications link during normal operation, and is monitored to ensure differential operation. In response to primary channel failure, the secondary channel becomes the communications link.

2 Claims, 11 Drawing Figures

FAULT TOLERANT COMMUNICATIONS INTERFACE

TECHNICAL FIELD

This invention relates to signal communications circuitry, and more particularly to a serial signal communications interface for a digital flight data recording system (DFDRS).

BACKGROUND ART

Digital flight data recording systems (DFDRS) provide nonvolatile recording of sensed flight data signal information for post flight analysis of aircraft performance. This occurs through reconstruction of the recorded real time flight information. The information is first compressed by data acquisition circuitry (DAU) and the most significant sensed data values are formatted into message frames and transmitted from the DAU to a nonvolatile recorder memory.

The data is transmitted between the DAU and recorder memory through a serial digital signal communication link defined by the Electronics Industry of America (EIA) full duplex RS422 specification, which requires a pair of two wire transmission lines for simultaneously transmitting data in each direction. In the DFDRS, however, data transmission only occurs in one direction at a time, i.e. half duplex. The RS422 specification requires the data to be encoded in a differential format in which the voltage of one line with respect to the other is plus or minus five volts, all of which is known to those skilled in the art.

The fidelity of the recorded information is critical for resolute waveform reconstruction. Since the communications interface between the DAU and recoder is necessary to the storing of the information, the reliability of the communications circuitry is critcal to the overall reliability of the recording system.

DISCLOSURE OF INVENTION

The object of the present invention is to provide a fault tolerant communications interface for half duplex digital signal transmission between signal transceivers, such as may be used between subsystems of a DFDRS.

According to the present invention, a fault tolerant communications interface includes first and second transmission lines, each having two signal conductors, for providing redundant transmission of the same signal data through each. Each transmission line transmitting the serial bit data as opposite polarity serial bit signals on each of the two conductors within each line, with only the first transmission line being electrically connected to the signal transceivers so long as there is a continued, simultaneous presence and, alternately, a simultaneous absence of the differential signal. Fault monitoring circuitry determines the continued presence or absence of a differential mode signal through the first transmission line, and in the event of the loss of differential signal therethrough, disconnects the first transmission line and connects the second transmission line between the two transceivers.

In further accord with the present invention, the fault detection circuitry compares the signal potential on each conductor of the first transmission line using a Boollean Exclusive OR logic function.

The present communications interface is fault tolerant in that it provides for continuous transmission in the presence of a failure of one of two signal channels. Both channels transmit data simultaneously but only one, a primary channel, provides the actual communications path between subsystems in the presence of operability of the primary channel. Since transmission through each channel is differential, each wire conductor of a channel pair is at a different signal potential from the other at all times during normal operation. The existence of a common potential between the two conductors is indicative of a transmission fault, e.g. a short circuit. In the presence of a detected fault the interface automatically switches signal transmission to the second channel pair.

These and other objects, features, and advantages of the present invention will become more apparent in light of the following detailed description of a best mode embodiment thereof, as illustrated in the accompanying drawing.

BEST MODE FOR CARRYING OUT THE INVENTION

Figure 2:
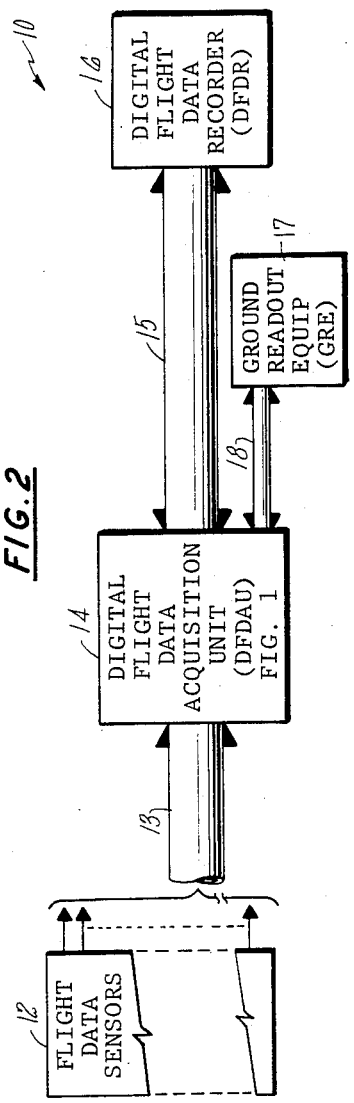
FIG. 2 is a simplified block diagram illustration of the DFDRS of FIG. 1.

Referring first to the simplified system diagram of a digital flight data recording system (DFDRS) 10 of FIG. 2. The DFDRS receives sensed flight parameter information in a combination of analog, discrete, and digital signal formats from data sensors 12, on lines 13. The sensed parameter signals are conditioned and compressed in a digital flight data acquisition unit (DFDAU) 14, and selected compressed parameter signals are transmitted through lines 15 to a crash survivable digital flight data recorder (DFDR) 16. The DFDR provides nonvolatile recording of the data for later retrieval by ground readout equipment (GRE) 17, connected through lines 18 to the DFDAU.

Figure 3:
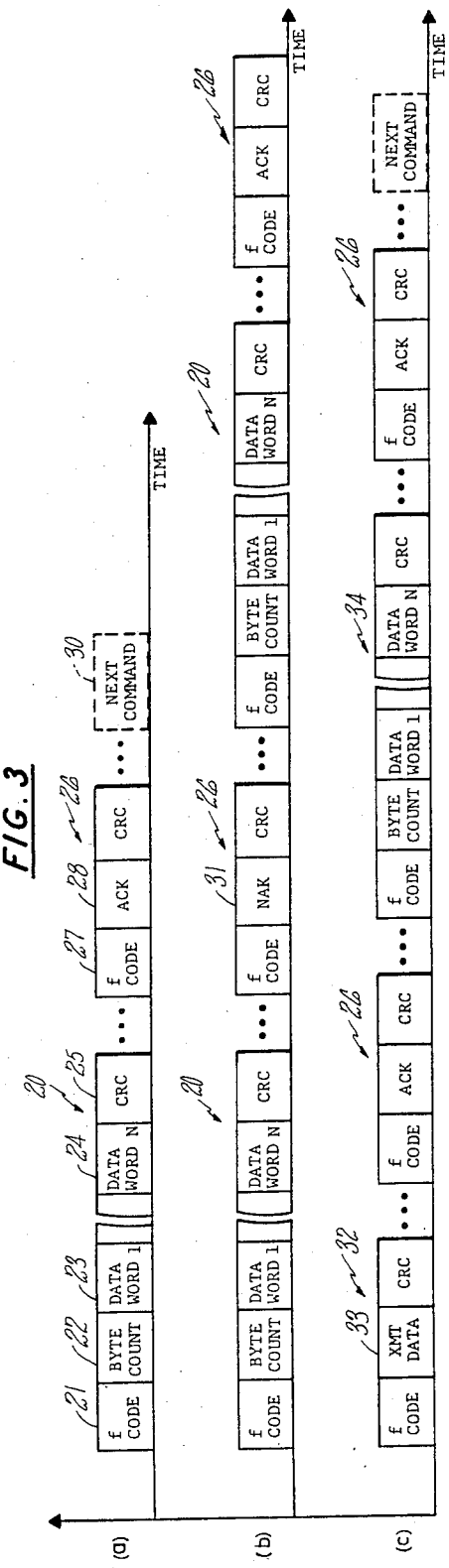
FIG. 3 is an illustration of the FIG. 1 DFDRS communications protocol used in the description of the present invention.

Communications on lines 15 between the DFDAU and the DFDRS is bidirectional. The compressed signal data is presented by the DFDAU to the DFDR for recording, and recorded data is read out through the DFDAU for retrieval by ground readout equipment 17. Bidirectional transmission is not simultaneous, therefore, a half duplex interface may be used. FIG. 3 illustrates a typical half duplex protocol with three exemplary data transfer situations in each direction, i.e. between "source" (the transmitting device) and "sink" (the receiving device).

Data between source and sink (DFDAU and DFDRS) is transferred in serial bit messages, each including two or more signal units. A signal unit is a plurality of signal bits, preferably eight bits which equal a byte signal unit, so that each message includes two or more signal bytes. FIG. 3, illustration (a) shows a typical communications sequence beginning with a source message 20 including a byte function (f) code byte 21 which identifies the message function, e.g. a store data command from the DFDAU to the DFDRS. The second byte 22 is a data byte count indicating the number (N) of data bytes (or data words) in the message; the number varies between messages. The data bytes follow with data words 23 through 24. A known type cyclic redundancy check (CRC) code byte 25 is the last signal unit of the message.

The message length is limited to a minimum number of signal units. In a preferred embodiment the minimum is three bytes; a transmission function code byte, a data word count byte, and a CRC byte.

Each received message is checked by the sink for errors. This includes: a check for a valid transmission function code, verification that the data word count byte is no greater than the maximum permitted, and confirming that the CRC code is correct. Following the error check the sink sends a confirmation message 26 to the source. The confirmation is either an acknowledge (ACK) or not acknowlege (NAK) message. An ACK message is transmitted to the source if the sink has confirmed that the message was correctly received and NAK message is transmitted when the sink determines that the message is in error. The confirmation message (ACK or NAK) is transmitted within a maximum response time (typically 50 milliseconds) of receipt of the CRC byte.

The confirmation message 26 includes a function code byte 27, the ACK or NAK byte 28, and the CRC code byte 29. In illustration (a) the confirmation message is an ACK, and the sink waits for the next command 30 from the source. In illustration (b) the same source message 20 is transmitted but is in error so that confirmation message 26 includes a NAK byte 31. As a result the source message 20 is repeated, received correctly, and acknowledged by an ACK confirmation message 26.

Illustration (c) demonstrates the reverse communications in which the DFDRS transmits data stored in memory back to the DFDAU. The DFDAU source message 32 includes a function code requesting transmission of data from the DFDRS and a transmit data byte 33 which identifies the data requested. A confirmation message 26 from the DFDRS (sink) acknowledges receipt followed by the DFDRS (source) transmission of data message 34. The data message 34 is in the same format as data messages 20 from the DFDAU. The DFDAU now acting as the sink provides confirmation message 26 in the form of an ACK.

Figure 1:
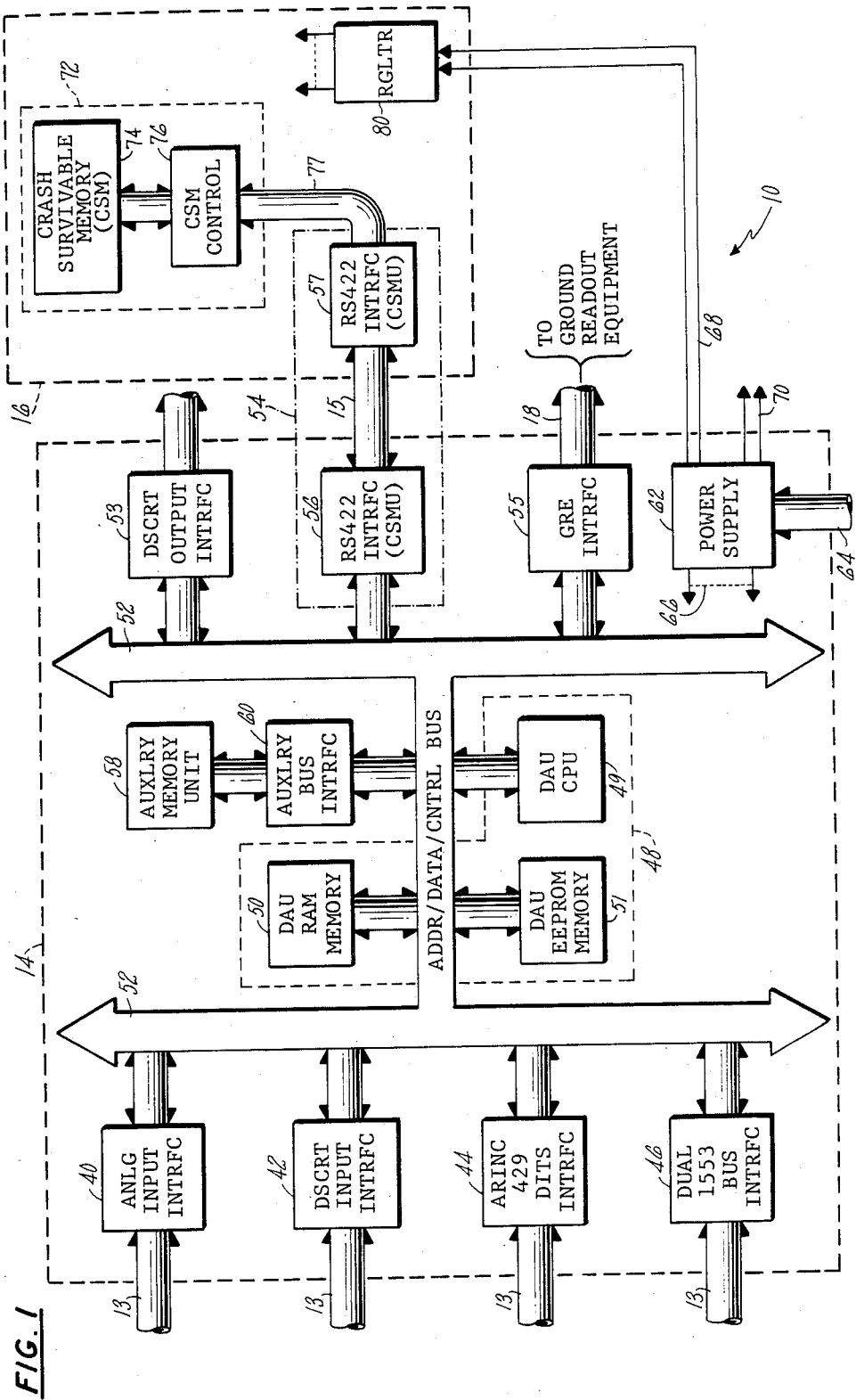
FIG. 1 is a system block diagram illustration of a digital flight data recording system (DFDRS) in which the present invention may be used.

Referring now to FIG. 1, in a detailed system block diagram of a DFDRS 10 in which the present invention be used, the signals from sensors 12 are presented to different signal type interfaces within the DFDAU 14. These include analog input interface 40, discrete signal input interface 42, ARINC 429 digital information transfer system (DITS) input interface 44, and a dual MIL-STD-1553 bus interface 46. Each interface converts the received input data into a digital format compatible with the DFDAU signal processor 48. Each interface stores the output signal information in a direct memory access (DMA) within the interface (not shown) for retrieval by the DFDAU signal processor.

The signal processor is a known type which includes a CPU 49, such as a ZILOG ModeL Z8002 microprocessor, and local RAM and ROM 50, 51. The signal processor 48 accesses each of the interface conditioned output signals via the system ADDRESS/DATA/CONTROL Bus 52, using software techniques and methods known to those skilled in the art of software programming.

The DFDAU output interfaces include: a discrete signal output interface 53, DFDAU/DFDRS communication interface 54, and GRE interface 55. The communications interfaces 54, 55 are serial RS-422 communication interfaces with differential data transmission, and the frame signal format described in FIG. 3. The communications interface 54 provides DFDAU to DFDR subsystem communications through termination networks 56, 57 and lines 15, as described in detail hereinafter. The interface 56 communicates through lines 18 with ground readout equipment 17 (FIG. 2).

The DFDAU includes supplemental memory storage in an auxiliary memory unit (AMU) 58 connected to the system bus 52 through an auxiliary bus interface 60. The AMU is nonvolatile, and provides storage for sensed flight data parameters which need not be recorded in the crash survivable memory within the DFDR 16. The DFDR provides storage of mandatory recording parameters in a crash survivable memory unit (CSMU) 72. The CSMU is an armored housing which protects an internal crash survivable memory (CSM) 74 and CSM control 76 from penetration during crash. The CSM control communicates with the DFDAU through lines 77 and communication interface 54 which, with a DFDR voltage regulator 80, is located outside the CSMU.

The DFDR read/write operation is controlled by CSM control 76 which includes a known type CPU, such as the INTEL Model 8051 microprocessor. The control determines where DAU framed signal data is to be stored in the CSM. It is responsible for protecting data associated with special events, i.e. "protected data", by preventing the protected data from being overwritten with more recent data prior to readout by the ground readout equipment (GRE).

When a DAU command is received to store data the control writes a frame of data to the appropriate CSM location, together with a frame address. The frames typically are written once per second. If the data is protected the control writes START and END addresses for each protected block into a protected data memory map. The protected block will not be overwritten until a command to overwrite is received from the DAU.

Figure 4:
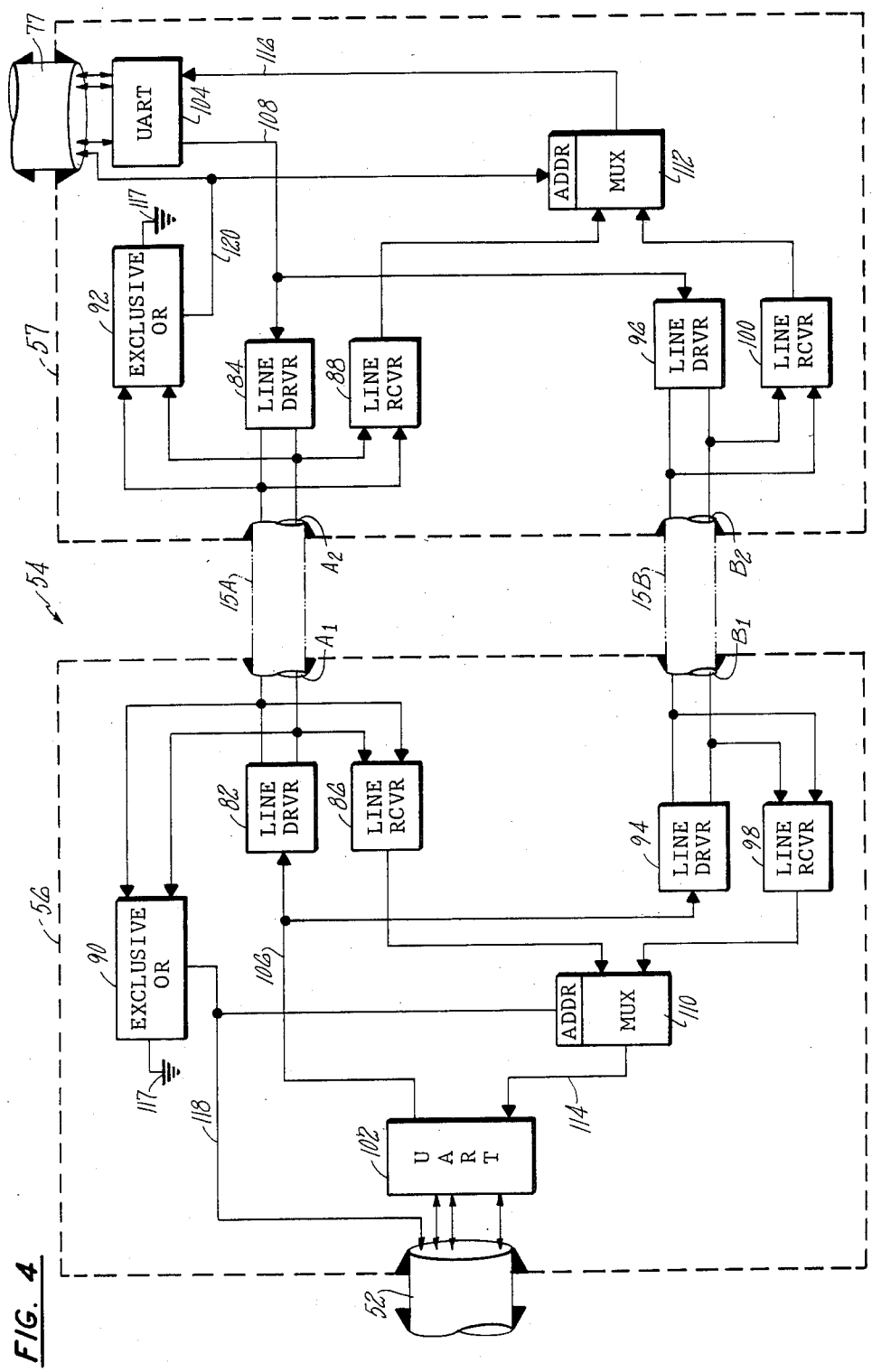
FIG. 4 is a block diagram illustration of the present invention for use in the DFDRS of FIG. 1.

FIG. 4, is a detailed block diagram of the communications interface 54. The circuitry includes termination networks 56, 57 which interface the communications subsystems with a pair of signal transmission channels 15A, 15B of transmission line 15 (FIG. 1). Each channel includes a pair of conductors, e.g. A1, A2 and B1, B2. Both channels transmit the same data simultaneously, but only one channel completes communication through the termination circuits to the subsystems. The second channel transmits but does not receive until enabled. There is no enablement until the first, or primary channel fails.

In FIG. 4, 15A is the primary channel and is terminated in each termination circuit in individual line driver circuitry 82, 84, line receiver circuitry 86, 88 and fault detection circuitry 90, 92. The secondary channel 15B is similarly terminated in its own line driver circuitry 94, 96 and line receiver circuitry 98, 100. The secondary channel does not include fault detection circuitry. The termination circuits couple the communications interface to the user (host) systems (the DFDAU and DFDRS in the FIG. 1) through Universal Asynchronous Receive and Transmit (UART) circuitry 102, 104 connected to the DFDAU BUS 52 and CSM control lines 77.

The UARTs are a known type, such as an INTEL model 8251A, and convert the parallel signal bit input from the user system to a serial bit format transmitted through the communications interface. The serial bit "source" signal information (that to be transmitted) is presented from UARTs 102, 104 through lines 106, 108 to the respective line driver circuitry in each network. The received signal information from the two channel line receivers are presented through associated multiplexer (MUX) circuitry 110, 112 and lines 114, 116 to the respective UARTs inputs. The primary channel fault detection circuitry 90, 92 monitors the signal potential of each conductor with respect to signal ground 117.

The serial data is transmitted differentially through each channel. The line driver circuits 82, 84 and 94, 96 couple the 106, 108 source signal to each conductor of each channel; one conductor is in phase (0° phase shift) and the second conductor signal is inverted (180° phase shift). The real time signal waveforms on each conductor relative to signal ground 117, are 180° out of phase. The transmitted signal value is the difference potential between the two signals; the two potentials measured to ground should never be the same in normal operation. The fault circuitry monitors the potential on each line to detect the occurrence of an equal potential condition. The most common cause of this is a short circuit of one of the conductors to signal ground. As long as the signal potentials on each of the two conductors are different the fault detection circuitry remains in a first, or operative state. If the same signal potential is detected on the two lines at any time, the detection circuitry transitions to a second, or fault state. The fault detection circuitry logic is the Boolean Exclusive OR, e.g. 54LS86 integrated circuit logic. If the fault detection state is Y, then for signal potentials A1, A2 the fault detection logic is:

| A1 | A2 | Y |
|----|----|----|
| 0  | 0  | 0  |
| 0  | 1  | 1  |
| 1  | 0  | 1  |
| 1  | 1  | 0  |

The Y=0 state represents the fault state and Y=1 is the operative state.

The state of the fault circuits 90, 92 is indicated by a STATE SIGNAL provided from each on lines 118, 120. In the present communications interface the presence of the fault state results in automatic transition of the signal transmission path from the primary channel 15A to the secondary channel 15B. This results from the use of the fault detection STATE SIGNAL to change the address of the MUXs 110, 112 from the primary channel line receivers 86, 88 to the secondary channel line receivers 98, 100. This all occurs simultaneously with the change in STATE SIGNAL from the detection circuitry.

In operation, the UART circuitry in each network converts the parallel signal format of the subsystem output bus to the serial bit format of FIG. 3. The UART circuitry adds START and STOP bits, and a parity bit to each message byte. These additional bits are stripped off by the receiving UART and are transparent to the transmission protocol.

Figure 5:
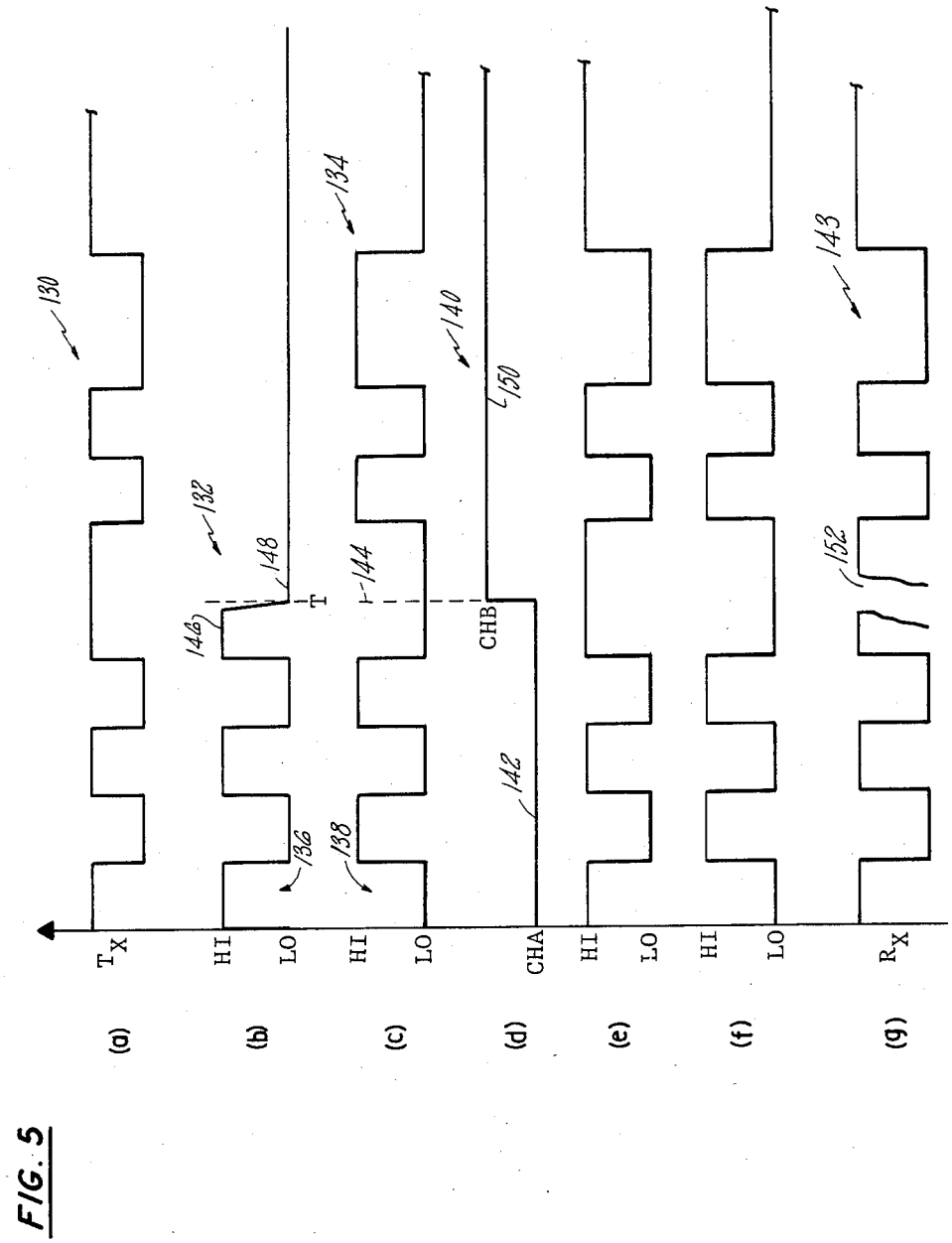
FIG. 5 is an illustration of waveforms used in the description of operation of the invention.

FIG. 5, illustration (a) shows a return to zero (RZ) serial signal format which may be used by the communications interface. The illustration (a) signal waveform 130 is a 1 0 1 0 1 1 0 1 0 0 1 1 segment as may appear on the transmit ($T_X$) lines 106, 108. The source line drivers couple the $T_X$ signal to each channel pair conductor. Illustrations (b), (c) represent the A1, A2 conductor waveforms 132, 134 as measured to signal ground 117. As shown, the two are normally 180° out of phase 136, 138; the first conductor (A1) first bit 136 appearing as a logic one whereas the second conductor (A2) first bit 138 is a logic zero. Illustration (d) is the fault detection circuit bistable gate signal waveform 140, with an initial operative state 142 during which communication is via primary channel A.

Illustrations (e) and (f) illustrate the redundant signal waveforms 130', 132' applied to the secondary channel conductors B1, B2. Lastly, illustration (g) represents the signal waveform 143 received by the sink UART.

A fault condition is assumed to occur on primary channel conductor A1 (illustration (b)) at time T144. The fault causes the otherwise high potential signal 146 on A1 to go low 148, equal to that of A2 (illustration (c)). This equal potential condition on both lines is detected by fault circuits 90, 92 as the absence of a difference signal magnitude, changing the gate signal state (illustration (d)) to inoperative 150. This addresses both MUX's 110, 112 to the channel B inputs. The signals on secondary channel conductors B1, B2 are unaffected, as shown in illustrations (e), (f).

The fault is detected immediately, however, due to the response time of the fault detection circuitry and MUX there is an interruption 152 in the sink received signal. This signal breakup is detected by the CRC code check requiring retransmission of the message as described hereinbefore.

Although the invention has been shown and described with respect to a best mode embodiment thereof, it should be understood by those skilled in the art that the foregoing and various other changes, omissions, and additions may be made therein without departing from the spirit and scope of the invention.

We claim:

1. Apparatus for providing half-duplex transmission of user digital data signals between two user signal transceivers, comprising:

first and second transmission lines, each having first and second conductors adapted to receive, individually, a serial bit digital signal;

network means, one for each signal transceiver, each network including universal asynchronous receive and transmit (UART) means, for converting user data signals from the transceiver into apparatus serial bit signals, and for reconverting apparatus serial bit signals into user data signals for presentation to the transceiver;

line driver means, one associated with each said transmission line, each converting said apparatus serial bit signals from said UART into two opposite polarity serial bit signals for presentation to a related one of said first and second conductors of said associated transmission line;

line receiver means, one associated with each said transmission line, each converting said opposite polarity serial bit signals received from said first and second conductors of said associated transmission line to an apparatus serial bit signal;

fault monitor means, connected at first and second signal inputs thereof to said first and second conductors of said first transmission line, for providing a bistable fault signal having an enable state, in response to the simultaneous presence and, alternately, the simultaneous absence of said opposite polarity serial bit signals on said first and second conductors, said fault signal having an alarm state at all other times; and signal multiplexer means, responsive to said apparatus serial bit signals from said line receiver means at first and second inputs thereof, and responsive to said fault signal at an address input thereof, for presenting said apparatus serial bit signal from said line receiver associated with said first transmission line to said UART in the presence of said fault signal enable state, and for presenting said apparatus serial bit signal from said line receiver associated with said second transmission line to said UART in the presence of said fault signal alarm state.

2. The apparatus of claim 1, wherein said fault monitor means comprises exclusive OR logic circuitry.

* * * * *